US009025558B2

(12) United States Patent
Seok

(10) Patent No.: US 9,025,558 B2
(45) Date of Patent: *May 5, 2015

(54) METHOD FOR SETTING MODULATION AND CODING SCHEME IN WIRELESS RAN SYSTEM AND APPARATUS SUPPORTING THE SAME

(71) Applicant: LG Electronics Inc., Seoul (KR)

(72) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/339,337

(22) Filed: Jul. 23, 2014

(65) Prior Publication Data

US 2014/0334413 A1 Nov. 13, 2014

Related U.S. Application Data

(63) Continuation of application No. 13/392,837, filed as application No. PCT/KR2010/005465 on Aug. 18, 2010, now Pat. No. 8,824,400.

(60) Provisional application No. 61/237,300, filed on Aug. 27, 2009.

(30) Foreign Application Priority Data

Apr. 30, 2010 (KR) .................. 10-2010-0040590

(51) Int. Cl.
*H04L 29/04* (2006.01)
*H04W 72/04* (2009.01)
(Continued)

(52) U.S. Cl.
CPC ........... *H04W 72/046* (2013.01); *H04L 1/0003* (2013.01); *H04L 1/0009* (2013.01); *H04L 1/0031* (2013.01); *H04L 1/1607* (2013.01); *H04B 7/0452* (2013.01); *H04W 84/12* (2013.01)

(58) Field of Classification Search
CPC ...................................................... H04B 7/0452
See application file for complete search history.

(56) References Cited

U.S. PATENT DOCUMENTS 7,372,912 B2    5/2008  Seo et al.
7,751,368 B2    7/2010  Li et al.
(Continued)

FOREIGN PATENT DOCUMENTS

KR    10-2006-0090541 A    8/2006
KR        10-0677568 B1    1/2007
KR    10-2009-0050134 A    5/2009

OTHER PUBLICATIONS

Mujtaba, "TGn Sync Proposal Technical Specification", IEEE 802.11-04/889rl, Nov. 4, 2004, pp. 1-143.
(Continued)

*Primary Examiner* — Chirag Shah
*Assistant Examiner* — Rina Pancholi
(74) *Attorney, Agent, or Firm* — Birch, Stewart, Kolasch & Birch, LLP

(57) ABSTRACT

A method of transmitting data by a multi-user multiple input multiple output (MU-MIMO) transmitter in a wireless local area network system. The method includes transmitting by the MU-MIMO transmitter, a physical layer convergence procedure (PLCP) protocol data unit (PPDU), the PPDU including a bundled interface field, a modulation and coding scheme (MCS) index field and a data field; and transmitting, by the MU-MIMO transmitter, the PPDU to a receiving station. The bundled interface field indicates a number of a plurality of spatial streams allocated to the receiving station. The MCS index field indicates a same MCS index used for modulating and coding all of the plurality of spatial streams indicated by the bundled interface field. The data field is modulated and coded by an MCS scheme indicated by the MCS index field and transmitted via the plurality of spatial streams indicated by the bundled interface field.

6 Claims, 5 Drawing Sheets

(51) Int. Cl.
*H04L 1/00* (2006.01)
*H04B 7/04* (2006.01)
*H04L 1/16* (2006.01)
*H04W 84/12* (2009.01)

(56) References Cited

U.S. PATENT DOCUMENTS

| 7,764,727 | B2 | 7/2010 | Ye et al. | |
|---|---|---|---|---|
| 2008/0013505 | A1 | 1/2008 | Trainin | |
| 2008/0112430 | A1 | 5/2008 | Kwon et al. | |
| 2009/0170509 | A1* | 7/2009 | Cai et al. | 455/434 |
| 2011/0002219 | A1* | 1/2011 | Kim et al. | 370/203 |
| 2011/0194475 | A1* | 8/2011 | Kim et al. | 370/311 |
| 2012/0275376 | A1* | 11/2012 | Sampath et al. | 370/328 |
| 2013/0229996 | A1* | 9/2013 | Wang et al. | 370/329 |

OTHER PUBLICATIONS

Stankovic et al., "Multiuser mimo downlink precoding for users with multiple antennas", Procedings of 12-th Meeting of the Wireless World research Forum (WWRF), Toronto Canada, Nov. 2004.

Tandai et al., "Cross-Layer-Optimized User Grouping Strategy in Downlink Multiuser MIMO Systems", Vehicular Technology Conference, 2009, pp. 1-6, Apr. 2009.

* cited by examiner

METHOD FOR SETTING MODULATION AND CODING SCHEME IN WIRELESS RAN SYSTEM AND APPARATUS SUPPORTING THE SAME

CROSS-REFERENCE TO RELATED APPLICATIONS

This application is a Continuation of co-pending application Ser. No. 13/392,837, filed on Feb. 27, 2012, which was filed as the National Phase of PCT/KR2010/005465 on Aug. 18, 2010, which claims the benefit under 35 U.S.C. 119(e) to U.S. Provisional Application No. 61/237,300 filed on Aug. 27, 2009, and under 35 U.S.C. 119(a) to Patent Application No. 10-2010-0040590 filed in the Republic of Korea on Apr. 30, 2010, all of which are hereby expressly incorporated by reference into the present application.

BACKGROUND OF THE INVENTION

1. Field of the Invention

The present invention relates to wireless communications, and more particularly, to a method for setting a modulation and coding scheme (MCS) in a wireless local area network (WLAN) system supporting multiple input multiple output (MIMO) and a wireless apparatus supporting the method.

2. Discussion of the Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate.

The MIMO technique combines data streams which arrive with various time differences through various paths to effectively improve signal capability of the receiver, and thus activates a function of a smart antenna. A single input single output (SISO) technique allows one system to transmit and receive only one spatial stream at one time, whereas a MIMO technique allows transmission of multiple spatial streams. The MIMO technique can increase channel capacity in proportion to the number of antennas without additional frequency allocation or transmit power allocation. Channel capacity in a limited frequency resource is increased by using multiple antennas at both ends, and a high data rate is guaranteed.

The IEEE 802.11n standard can perform data transmission by using a channel having four spatial streams and a 40 MHz bandwidth. In this case, an equal modulation (EQM) scheme in which all streams have the same MCS level or an unequal modulation (UEQM) scheme in which each stream has a different MCS level can be used.

Recently, a channel having a bandwidth of 80 MHz is used to provide a throughput of 1 Gbps or higher, and researches for supporting multi-user (MU) MIMO are actively ongoing to enable data transmission/reception with respect to an access point (AP) by utilizing the channel simultaneously by several stations to effectively use the channel. With the use of the wider bandwidth and the support of the MU-MIMO, it is expected to use more spatial streams to perform data transmission by a station and an AP having more transmission (TX)/reception (RX) interfaces.

SUMMARY OF INVENTION

The present invention provides a method for adaptively setting a modulation and coding scheme (MCS) level depending on a channel situation in data transmission using a plurality of multiple streams and a wireless apparatus supporting the method.

The present invention also provides a method for decreasing overhead based on setting of an MCS level in data transmission using a plurality of multiple streams and for setting an MCS level having low complexity, and a wireless apparatus supporting the method.

According to an aspect of the present invention, a method for setting a modulation and coding scheme (MCS) performed by a transmitting station which supports multi user-multiple input multiple output (MU-MIMO) is provided. The method includes: dividing a plurality of transmission (TX)/reception (RX) interfaces of the transmitting station into at least one bundled interface including at least one of the TX/RX interfaces; modulating a data stream to be transmitted through the TX/RX interface included in the at least one bundled interface by applying the MCS on a bundled interface basis; and spatially multiplexing the modulated data stream and transmitting the multiplexed modulated data stream through each of the plurality of TX/RX interfaces.

In the aforementioned aspect of the present invention, a modulation scheme may be individually determined/applied for each bundled interface, and the same modulation scheme may be applied to a data stream transmitted through the TX/RX interface included in the bundled interface.

In addition, bundled interface information used to allow a receiving station to identify the TX/RX interface included in the bundled interface and MCS information used to allow the receiving station to know an MCS applied to the modulated data stream may be transmitted to the receiving station together with the modulation data stream.

In addition, the bundled interface information and the MCS information may be transmitted by being included in a physical layer convergence procedure (PLCP) protocol data unit (PPDU), and the transmitting station may change the TX/RX interface included in the bundled interface on the PPDU basis and the MCS applied to the TX/RX bundled interface.

In addition, the bundled interface information may be a value indicating the number of TX/RX interfaces included per one bundled interface, and may be included in a VHT-SIG of the PPDU as a subfield.

In addition, the bundled interface information may be a value indicating an identifier of the TX/RX interface included in the bundled interface, and may be included in a VHT-SIG field of the PPDU as a subfield.

In addition, the MCS information may be a value indicating an index number of an index set predetermined and stored in the receiving station, and may be included in a VHT-SIG field of the PPDU as a subfield.

According to the present invention, data transmission using multi user-multiple input multiple output (MU-MIMO) can be performed to increase efficiency of radio resource utilization by adaptively controlling a modulation and coding scheme (MCS) depending on a wireless environment, a data priority, and an importance, and complexity can be decreased in transmission performed by utilizing a plurality of spatial streams.

DETAILED DESCRIPTION OF THE INVENTION

Hereinafter, the present invention will be described in detail with reference to the accompanying drawings.

Figure 1:
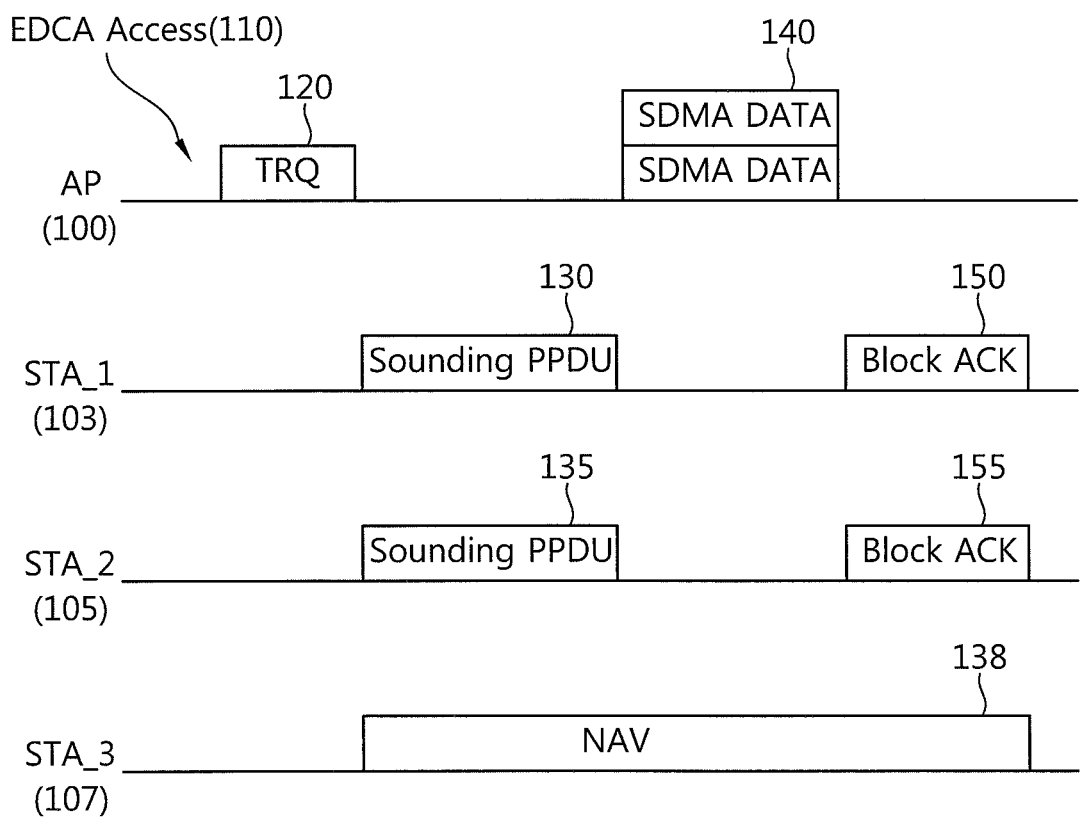
FIG. 1 shows an example of downlink data transmission using multi user-multiple input multiple output (MU-MIMO).

FIG. 1 shows an example of downlink data transmission using multi user-multiple input multiple output (MU-MIMO). In downlink MU-MIMO, an access point (AP) 100 transmits a training request (TRQ) frame 120 to data transmission target stations (STAs) after performing an enhanced distributed channel access (EDCA) 110 based on the institute of electrical and electronics engineers (IEEE) 802.11 standard. In the example of FIG. 1, the transmission target STAs are an STA_1 103 and an STA_2 105. The TRQ frame 120 may include a transmission time and a list of target STAs for transmitting a data frame by using downlink MU-MIMO. In the example of FIG. 1, the list of target STAs includes the STA_1 103 and the STA_2 105. The transmission time is a time required for transmitting data by the AP 100 to the STA 1 103 and the STA_2 105.

If the STA which receives the TRQ frame is a target STA for receiving data, a sounding physical layer convergence procedure (PLCP) protocol data unit (PPDU) is transmitted to the AP. Herein, the sounding PPDU is a frame transmitted to allow an STA for receiving the sounding PPDU to be able to estimate a channel state between a transmitting STA and a receiving STA. That is, upon receiving the TRQ frame 120, the STA_1 103 and the STA_2 105 transmit a sounding PPDU 130 and a sounding PPDU 135 to the AP 100.

If the STA which receives the TRQ frame is not the target STA for receiving data, the STA configures a network allocation vector (NAV). In the example of FIG. 1, an STA_3 107 is not the target STA for receiving data, and thus configures an NAV 138 and suspends a channel access during a transmission time period. The AP 100 receives the sounding PPDU and acquires channel estimation information for the STA. The AP 100, the STA_1 103, and the STA_2 105 perform beamforming, and the AP 100 transmits a spatially-multiplexed data frame to the STA_1 103 and the STA_2 105. Upon receiving the data frame, the STA_1 103 and the STA_2 105 respectively transmit block acknowledgment (ACK) frames 150 and 155 to the AP 100 in response to the received data frame.

In this case, the data frame is transmitted to the STA by using a spatial multiplexing scheme. The spatial multiplexing scheme is a scheme for transmitting a data stream through a multiple spatial channel provided by using multiple antennas of the transmitting STA and the receiving STA.

Meanwhile, a modulation process is performed to carry data, which is coded by an encoder, on a carrier in data transmission. Various modulation schemes can be used such as amplitude shift keying (ASK), frequency shift keying (FSK), phase shift keying (PSK), quadrature amplitude modulation (QAM), or the like.

The PSK is less affected by noise in comparison with the ASK, and is less limited by a bandwidth in comparison with the FSK. When a signal is divided by a shift of $\pi/2$ by varying a phase shift level, it allows two bits per phase shift. This is called 4-PSK or QPSK. Likewise, when a phase shift level is set to $\pi/2$, it allows three bits per phase shift, which is called 8PSK. When a PSK order increases by decreasing the phase shift level, the number of bits that can be transmitted for each phase shift increases, which implies the increase in a bit rate. However, when the phase shift level decreases to obtain a high bit rate, there is a problem in that it is difficult for a receiving side to distinguish a small phase change.

The QAM is a scheme of combining the ASK and the PSK. The QAM can be modified variously. In theory, the QAM can be obtained by combining any measurable amplitude change and any measurable phase change. According to the combination, various QAM modulation levels (i.e., 4-QAM, 8-QAM, 16-QAM, 64-QAM, etc.) can be used in modulation. The QAM scheme is advantageously less sensitive to noise in a sense that the meaning of shift can be recovered from phase information even if a noise problem accompanied by amplitude shift occurs when a specific phase and a specific amplitude are associated according to a constellation design.

A transmitter determines which modulation scheme will be used by considering a received-signal environment of a receiver, power of the transmitter, an importance of data to be transmitted, a data amount, etc. Examples of the modulation scheme include not only the ASK and the FSK but also binary PSK (BPSK), quadrature PSK (QPSK), 16-QAM, 64-QAM, etc.

When using the 64-QAM which is a higher order modulation scheme in a situation where the receiver experiences fading, it is expected that transmission is not properly performed. Therefore, when a channel condition is poor due to an influence of fading or the like, transmission is performed by using the QPSK having a low modulation order. When the channel condition is good, the 64-QAM can be used for high-rate transmission.

In the PSK and QAM-type modulations, many symbols can be carried concurrently on a carrier when a modulation order is high. Therefore, although a more amount of information can be carried when using the 16-QAM in comparison with the 4-QAM and when using the 64-QAM in comparison with the 16-QAM, more power is consumed to identify each symbol. Consuming the more power implies the increase in an inter-symbol distance. The increase in the inter-symbol distance implies that symbols can be easily identified from one another in a probability sense. When using the same power, high order modulation has a high error rate in data transmission.

A plurality of spatial streams can be subjected to coding, modulation, etc., and then be transmitted through multiple antennas. The plurality of spatial streams transmitted through multiple antennas of the transmitter can be received through multiple antennas of the receiver.

Two modulation schemes for spatial streams can be taken into account when performing transmission/reception through multiple antennas. One is a scheme of applying one modulation scheme to all streams when modulating a plurality of data streams, and the other is a scheme of determining a modulation scheme for each data stream. The former is called equal modulation (EQM), and the latter is called unequal modulation (UEQM).

Since the EQM uses the same modulation scheme for all streams, there is an advantage in that the transmitter and the receiver can be implemented with less complexity and a relatively small number of bits can be used when a modulation scheme used by the transmitter is reported to the receiver. However, when a plurality of streams are transmitted, the modulation scheme cannot be controlled by considering a different environment for each channel. This implies in general that, when the modulation scheme is determined for data transmission, the modulation scheme and a modulation order are determined by the worst channel. Accordingly, low order modulation is applied even in case of a spatial stream transmitted through a relatively good wireless channel, which may result in waste of radio resources.

Unlike the EQM, the UEQM causes somewhat high complexity of the transmitter and the receiver. In addition, a more number of bits are used when the transmitter reports the modulation scheme applied for each stream to the receiver. When data is transmitted through N spatial streams, if one of P modulation schemes is applied for each stream by using the UEQM, the total number of possible cases is $P^N$. This implies that a bit value capable of indicating $P^N$ cases has to be used to report the modulation scheme (in case of using an MCS table to indicate the modulation scheme, an index value thereof is in the range of 0 to $P^N-1$).

Advantageously, however, according to a condition of a channel through which each spatial stream is transmitted, a spatial stream transmitted through a good channel is modulated by applying a relatively high modulation order, and a stream transmitted through a poor channel is modulated by applying a low modulation order, thereby being able to perform transmission optimized for the condition of the radio channel. This implies that limited radio resources can be effectively used.

The present invention proposes a new MCS method as a method for solving a problem in that the number of MCS index sets sharply increases in proportion to the number of spatial streams in use and for effectively using radio resources.

According to an embodiment of the present invention, transmission (TX)/reception (RX) interfaces of a transmitter and a receiver are managed by dividing the interfaces into several group. This is called a bundled interface in the present invention.

Figure 2:
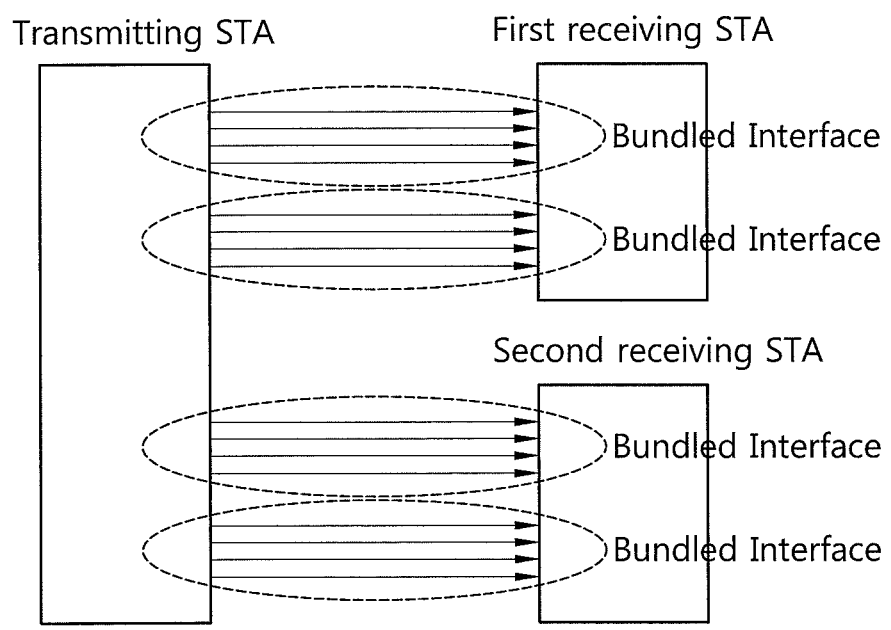
FIG. 2 shows an example of a method for a bundled interface according to an embodiment of the present invention.

FIG. 2 shows an example of a method for a bundled interface according to an embodiment of the present invention.

In the example of FIG. 2, a transmitting STA supports 16 TX/RX interfaces, and each receiving STA supports 8 TX/RX interfaces. Herein, the receiving STA and the transmitting STA are relative concepts, and can be mutually changed to each other anytime according to a direction of data frame transmission. The same is applied hereinafter.

In this case, when using the bundled interface proposed in the present invention, the 16 TX/RX interfaces of the transmitting STA are bundled into four groups, and thus it is regarded as having four TX/RX interfaces. Likewise, the 8 TX/RX interfaces of the receiving STA are bundled into two groups, and thus it is regarded as having two TX/RX interfaces. In this case, when UEQM is applied on a bundled interface group basis, the number of MCS index sets can be decreased.

In 16×16 MIMO transmission, if respective spatial streams use different MCSs, and a MCS value applicable to one spatial stream is 8, then a total number of MCS index sets is $8^{16}$. When a bundled interface is used to effectively support the UEQM in MIMO transmission which transmits data through a plurality of spatial streams, the number of MCS index sets can be adaptively changed from $8^{16}$ to $8^8$, $8^4$, etc., depending on a channel condition or the like.

According to the embodiment of the present invention, the EQM is used for a spatial stream that constitutes one bundled interface, and the UEQM is used for each bundled interface. Such a modulation scheme proposed in the present invention is called a Hybrid Modulation (HyM) scheme. The HyM using the bundled interface effectively supports the UEQM in MU-MIMO while decreasing the number of MCS index sets, and can increase a beam-forming gain.

Figure 3:
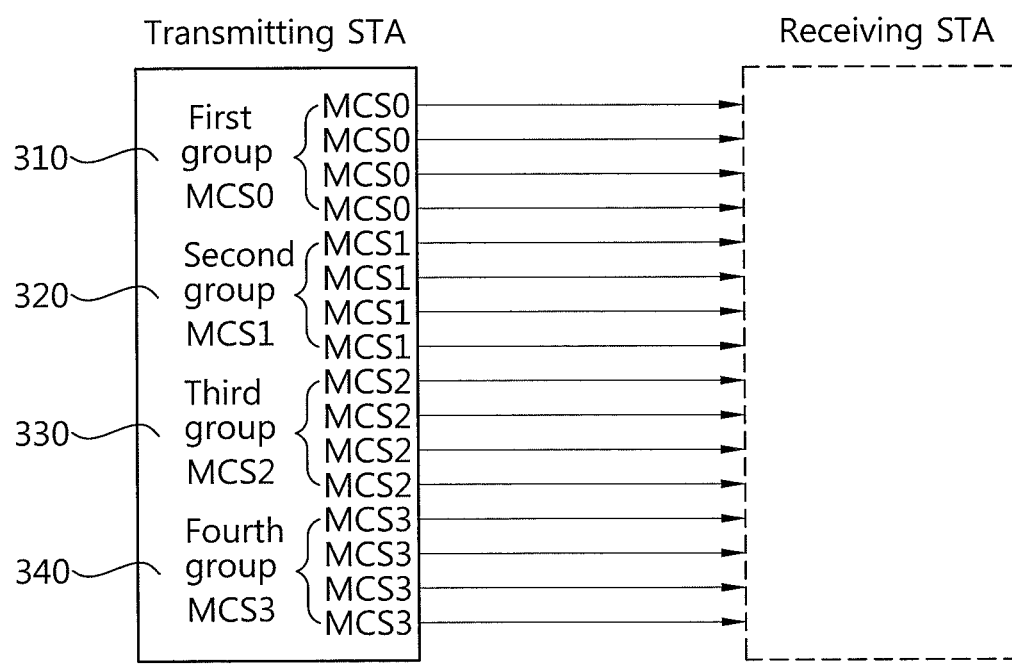
FIG. 3 shows an example of applying Hybrid Modulation (HyM) according to an embodiment of the present invention.

FIG. 3 shows an example of applying HyM according to an embodiment of the present invention.

In the example of FIG. 3, a transmitting STA can transmit 16 spatial streams through 16 TX/RX interfaces. When four interfaces are grouped as one bundle, the 16 TX/RX interfaces of the transmitting STA can be divided into a first group 310, a second group 320, a third group 330, and a fourth group 340. In this case, for the four groups, a different MCS can be applied to each group. An MCS0 is applied to a spatial stream transmitted through a TX/RX interface of the first group. An MCS 1 is applied to a spatial stream transmitted through a TX/RX interface of the second group. An MCS2 is applied to a spatial stream transmitted through a TX/RX interface of the third group. An MCS3 is applied to a spatial stream transmitted through a TX/RX interface of the fourth group. In this case, the same MCS is applied to spatial streams transmitted through four TX/RX interfaces of each group. That is, although the UEQM which uses a different MCS for each group is applied on a group basis (i.e., a group of 4 TX/RX bundled interfaces), the EQM is applied in terms of each of TX/RX interfaces in a group since the same MCS is applied to the four TX/RX interfaces that constitute each group.

Although four TX/RX interfaces are considered as one bundle in the example of FIG. 3, the number of TX/RX interfaces which are grouped as one bundle can be optionally controlled.

Upon receiving data modulated by using the HyM according to the present invention, HyM information needs to be reported to a receiver in order for the receiver to demodulate the received data. The HyM information may include information of bundled interfaces and/or information indicating a modulation scheme applied to each bundled interface.

The information of bundled interfaces may include information indicating 'number of bundled interface (N_bi)' information indicating the number of TX/RX interfaces included in one bundled interface. For example, if an N_bi value is set to 2 when 16 TX/RX interfaces are bundled, 8 groups are generated by considering two TX/RX interfaces as one group, and if the N_bi value is set to 4, four groups are generated by considering four TX/RX interfaces as one group. Likewise, if the N_bi value is set to 8, two groups are generated by considering 8 TX/RX interfaces as one group. If the N_bi value is set to 1, this is a case of not using the bundled interfaces, and if it is set to 16, this may imply that 16 data streams are modulated by using the EQM.

The information of bundled interfaces may include a number assigned to a TX/RX interface that constitutes the bundled interface with a different format for delivering the information of bundled interfaces.

Modulation scheme information applied to each bundled interface can be transmitted to the receiver as an MCS index number of an MCS index set. For this, the MCS index set can be stored in a management information base (MIB) or the like.

The information of bundled interfaces and modulation scheme information applied to each bundled interface can be transmitted through a separate frame for reporting this to the receiver or can be transmitted by being included in a PPDU.

Figure 4:
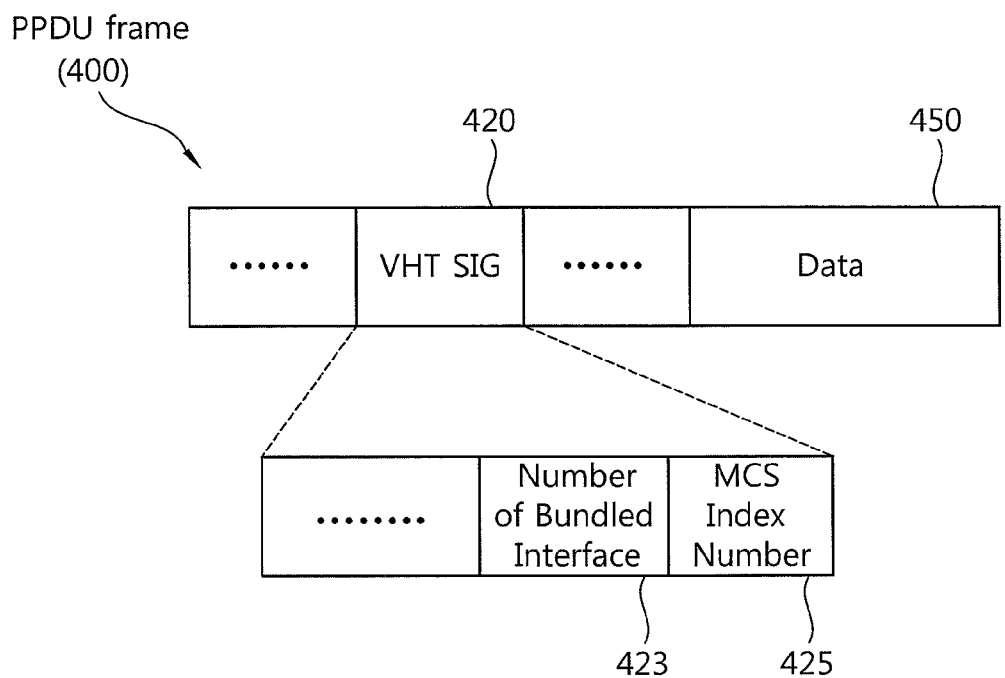
FIG. 4 shows an example of a physical layer convergence procedure (PLCP) protocol data unit (PPDU) frame format according to an exemplary embodiment of the present invention.

FIG. 4 shows an example of a PPDU frame format according to an exemplary embodiment of the present invention.

A PPDU frame 400 includes a VHT SIG field 420 and a data field 450. In addition thereto, in order to coexist with a legacy STA based on the IEEE 802.11 a/b/g/n, the PPDU frame 400 may optionally further include an L-STF field, an L-LTF field, an L-SIG field, an HT-SIG field, an HT-SFT field, an HT-LTF field, or the like of the IEEE 802.11n standard. The data field 450 includes a physical (PHY) service data unit (PSDU).

Information of bundled interfaces and modulation scheme information may be included in the VHT SIG field 420 of the PPDU as a subfield, or may be included in the PPDU frame 400 as a separate individual field. The example of FIG. 4 is a case where the information is included in the VHT SIG field as a subfield. In the example of FIG. 4, the information of bundled interfaces is included in a 'number of bundled interface (N_bi)' subfield 423, which indicates the number of interfaces included as one bundle, as a subfield. Further, the modulation scheme information is included in a PPDU frame in an MCS index number subfield 425, which indicates a number assigned to an MCS index set, as a subfield.

Upon receiving the PPDU, the receiving STA can know a modulation scheme applied to each stream from the modulation scheme information and the information of bundled interfaces included in the PPDU, and can perform demodulation on the basis of the modulation scheme.

Since the information of bundled interfaces and the modulation scheme information are transmitted by being included in the PPDU, the transmitting STA can set the information of bundled interfaces and the modulation scheme information differently on a PPDU basis. As a result, the modulation scheme can be determined/changed adaptively depending on a channel condition, a transmitted-data priority, or the like on the PPDU basis in data transmission.

As an example of data frame transmission according to the embodiment of the present invention, it is assumed that a transmitting STA supporting 8 TX/RX interfaces perform data transmission. The transmitting STA transmits a TRQ frame to transmission target STAs, and in response thereto, receives sounding PPDU frames from the transmission target STAs. Upon receiving the sounding PPDU frame and obtaining channel measurement information with respect to the transmission target STA, the transmitting STA performs beam-forming and transmits a PPDU frame. The PPDU frame includes the N_bi subfield 423 indicating the number of interfaces included in one bundle and the MCS index number subfield 425 as shown in the example of FIG. 4.

TABLE 1

| MCS Index | Modulation | | | |
|---|---|---|---|---|
| | Stream 1 | Stream 2 | Stream 3 | Stream 4 |
| 53 | 16-QAM | QPSK | QPSK | QPSK |
| 54 | 16-QAM | 16-QAM | QPSK | QPSK |
| 55 | 16-QAM | 16-QAM | 16-QAM | QPSK |
| 56 | 64-QAM | QPSK | QPSK | QPSK |
| 57 | 64-QAM | 16-QAM | QPSK | QPSK |
| 58 | 64-QAM | 16-QAM | 16-QAM | QPSK |
| 59 | 64-QAM | 16-QAM | 16-QAM | 16-QAM |
| 60 | 64-QAM | 64-QAM | QPSK | QPSK |
| 61 | 64-QAM | 64-QAM | 16-QAM | QPSK |
| 62 | 64-QAM | 64-QAM | 16-QAM | 16-QAM |

Table 1 shows an example of an MCS index set used in the IEEE 802.11n standard. Although an index set based on the IEEE 802.11n standard is described for example, this is for exemplary purposes only, and thus various MCS combinations can be newly defined for the embodiment of the present invention. In addition to modulation information of each stream, the index set may further include a coding rate, number of pilot values per OFDM symbol, number of coded bits per OFDM symbol, number of data bits per OFDM symbol, total bits per subcarrier, number of binary convolutional code (BCC) encoders for the data field, etc.

It is assumed in the present example that, when the index set of Table 1 is used, the transmitting STA transmits a PPDU frame by setting an N_bi subfield value to 2 and by setting an MCS index number subfield value to 58.

Upon receiving the PPDU frame, receiving STAs can know that 8 spatial streams grouped into 2 bundles are modulated from the N_bi subfield value of 2, and can know that 64-QAM, 16-QAM, 16-QAM, and BPSK are used as a modulation scheme from the index number 58. Accordingly, the receiving STAs can perform demodulation by calculating an MCS of each of a stream 1, a stream 2, a stream 3, a stream 4, a stream 5, a stream 6, a stream 7, and a stream 8 respectively by the use of 64-QAM, 64-QAM, 16-QAM, 16-QAM, 16-QAM, 16-QAM, QPSK, and QPSK. This is because the UEQM is used in terms of each group of bundled interfaces and the EQM is used within one bundled interface according to the HyM proposed by the present invention.

Figure 5:
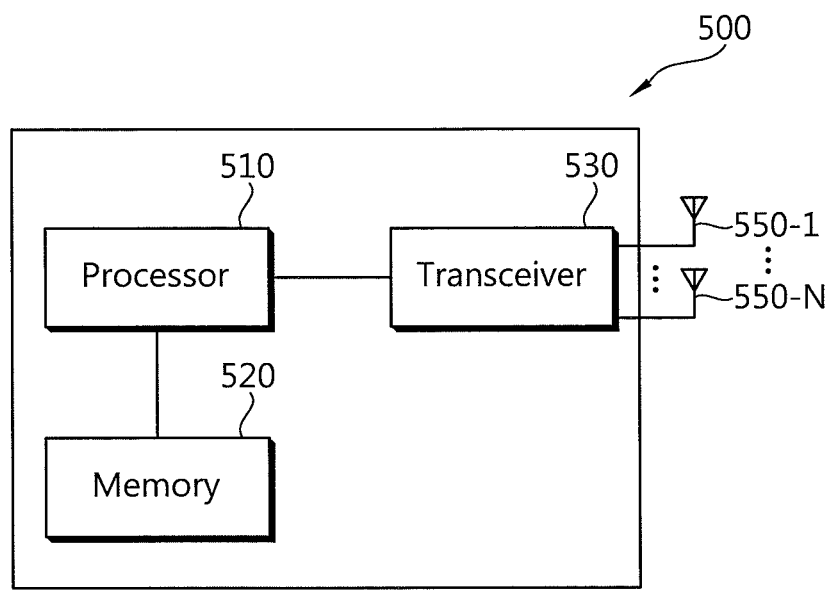
FIG. 5 is a block diagram showing a wireless apparatus according to an embodiment of the present invention.

FIG. 5 is a block diagram showing a wireless apparatus according to an embodiment of the present invention. A wireless apparatus 500 may be an AP or non-AP STA.

The wireless apparatus 500 includes a processor 510, a memory 520, a transceiver 530, and N antennas 550-1, . . . , 550-N. The transceiver 530 transmits/receives a radio signal, and implements a PHY layer of IEEE 802.11. The transceiver 530 supports MIMO transmission through the N antennas 550-1 . . . 550-N. The processor 510 coupled to the transceiver 530 implements a MAC layer of IEEE 802.11. When the processor 510 processes an operation of a transmitting STA among the aforementioned methods, the wireless apparatus 500 is the transmission STA. When the processor 510 processes an operation of a receiving STA among the aforementioned methods, the wireless apparatus 500 is the receiving STA. The processors 510 and/or the transceiver 530 may include an application-specific integrated circuit (ASIC), a separate chipset, a logic circuit, and/or a data processing unit. The memory 520 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 520 and may be performed by the processor 510. The memory 520 may be located inside or outside the processor 510, and may be coupled to the processor 510 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A method of transmitting data by a multi-user multiple input multiple output (MU-MIMO) transmitter in a wireless local area network system, the method comprising:
    generating, by the MU-MIMO transmitter, a physical layer convergence procedure (PLCP) protocol data unit (PPDU), the PPDU including a bundled interface field, a modulation and coding scheme (MCS) index field and a data field; and
    transmitting, by the MU-MIMO transmitter, the PPDU to a receiving station,
    wherein the bundled interface field indicates a number of a plurality of spatial streams allocated to the receiving station,
    wherein the MCS index field indicates a same MCS index used for modulating and coding all of the plurality of spatial streams indicated by the bundled interface field, and
    wherein the data field is modulated and coded by an MCS scheme indicated by the MCS index field and transmitted via the plurality of spatial streams indicated by the bundled interface field.

2. The method of claim 1, wherein the PPDU includes a plurality of bundled interface fields corresponding to a plurality of receiving stations.

3. The method of claim 2, wherein a number of the plurality of bundled interface fields is 4.

4. A multi-user multiple input multiple output (MU-MIMO) transmitter configured to transmit data in a wireless local area network system, the MU-MIMO transmitter comprising:
    a transceiver configured to receive and transmit radio signals; and
    a processor operatively coupled with the transceiver and configured to:
        generate a physical layer convergence procedure (PLCP) protocol data unit (PPDU), the PPDU including a bundled interface field, a modulation and coding scheme (MCS) index field and a data field, and
        instruct the transceiver to transmit the PPDU to a receiving station,
    wherein the bundled interface field indicates a number of a plurality of spatial streams allocated to the receiving station,
    wherein the MCS index field indicates a same MCS index used for modulating and coding all of the plurality of spatial streams indicated by the bundled interface field, and
    wherein the data field is modulated and coded by an MCS scheme indicated by the MCS index field and transmitted via the plurality of spatial streams indicated by the bundled interface field.

5. A method of receiving data from a multi-user multiple input multiple output (MU-MIMO) transmitter in a wireless local area network system, the method comprising:
    receiving, by a receiving station, a physical layer convergence procedure (PLCP) protocol data unit (PPDU) from the MU-MIMO transmitter, the PPDU including a bundled interface field, a modulation and coding scheme (MCS) index field and a data field,
    wherein the bundled interface field indicates a number of a plurality of spatial streams allocated to the receiving station,
    wherein the MCS index field indicates a same MCS index used for modulating and coding all of the plurality of spatial streams indicated by the bundled interface field, and
    wherein the data field is de-modulated and decoded by an MCS scheme indicated by the MCS index field and received via the plurality of spatial streams indicated by the bundled interface field.

6. A receiving device configured to receive data from a multi-user multiple input multiple output (MU-MIMO) transmitter in a wireless local area network system, the MU-MIMO transmitter comprising:
    a transceiver configured to receive and transmit radio signals; and
    a processor operatively coupled with the transceiver and configured to instruct the transceiver to receive a physical layer convergence procedure (PLCP) protocol data unit (PPDU) from the MU-MIMO transmitter, the PPDU including a bundled interface field, a modulation and coding scheme (MCS) index field and a data field,
    wherein the bundled interface field indicates a number of a plurality of spatial streams allocated to the receiving station,
    wherein the MCS index field indicates a same MCS index used for modulating and coding all of the plurality of spatial streams indicated by the bundled interface field, and
    wherein the data field is de-modulated and decoded by an MCS scheme indicated by the MCS index field and received via the plurality of spatial streams indicated by the bundled interface field.

* * * * *